3,269,171
APPARATUS FOR MEASURING THE VISCOSITY OF LIQUID AND PLASTIC MATERIALS
Herbert K. Bruss, 40 Schenck Ave., Great Neck, N.Y., and Abund O. Wist, 124 Meadowcroft Road, Mount Lebanon, Pa.
Filed June 14, 1965, Ser. No. 463,712
Claims priority, application Germany, June 19, 1964, B 69,950
12 Claims. (Cl. 73—60)

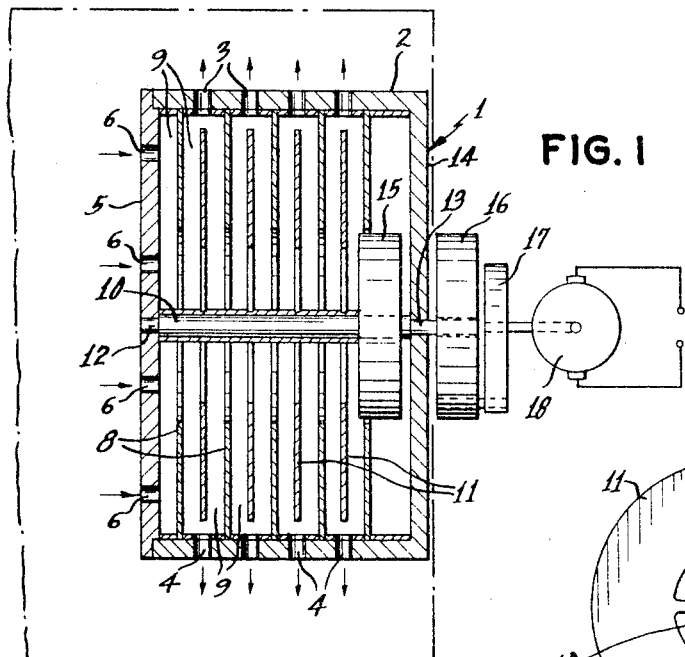
FIG. 1
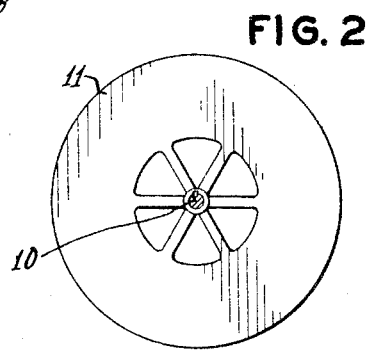
FIG. 2
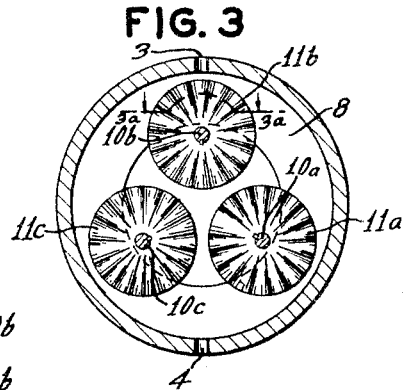
FIG. 3
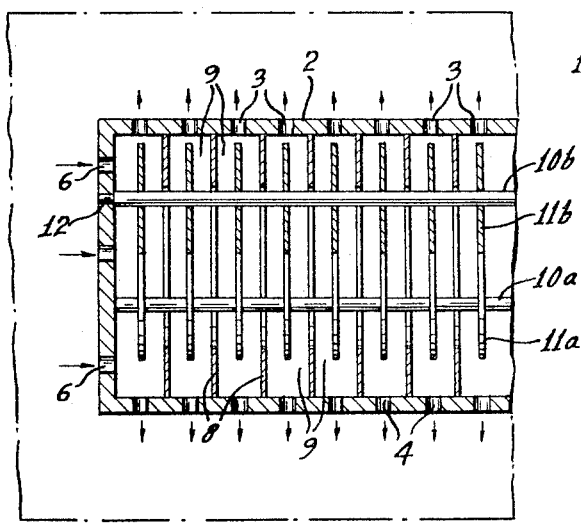
FIG. 4
FIG. 3a
INVENTORS
Herbert K. Bruss &
BY Abund O. Wist
James A. Eisenman
ATTORNEY United States Patent Office 3,269,171
Patented August 30, 1966

This application is a continuation-in-part of pending application Ser. No. 329,719, filed December 11, 1963, entitled, Apparatus for Mesuring the Viscosity of Liquid and Plastic Materials, now abandoned.

The present invention relates to the measurement of viscosity of liquid and plastic materials and, in particular, to viscometers capable of measuring liquid of extremely low viscosity.

Viscometers have been developed in which rotating bodies, typically of cylindrical contour, are connected to the drive shafts through interposed torsion springs, the displacement of which is a function of viscosity. The tension of the torsion springs is dependent, among other things, on the friction on the bearings of the rotating bodies and on the viscosity of the substances being measured, with the deflection of the rotating bodies, with respect to the driving shafts, being a measure of the viscosity.

Such devices, however, have the disadvantage that the cylindrical rotating bodies have relatively small surface areas relative to their masses, so that the influence of the bearing friction is relatively great. It is, therefore, difficult to measure precisely liquids of low viscosity. These difficulties become even greater than the substance to be measured contains small solids which erroneously reflect in the output measurement and which also cause premature wear of the bearings of the rotating body.

Moreover difficulties arise when conventional instruments are used in the monitoring of the production of highly concentrated suspensions, the viscosity of which is to be maintained constant, for example, by automatic feeding of solvents via a closed servoloop. In the case of cylindrical rotating bodies, portions of the cylindrical surface can lose contact with the substance to be measured, particularly at high rotational speeds. Also, a relatively long period of time normally passes before the thoroughly mixed substance comes into contact with all surfaces of the rotating body.

These and other disadvantages and difficulties of conventional viscometers are substantially reduced by the present invention, in accordance with which the rotating body can take the form of a plurality of measurement discs secured in spaced relation to one or more driven shafts so that relatively large torques are produced, making precise measurement possible even in the case of substance of low viscosity. Increased torques can be derived by means of supplemental, fixed vanes or annular rings carried by a housing and interleaved with rotating discs. Another feature of the invention is that the weight of the rotor shaft, together with the weight of the measurement discs keyed on to it, can be maintained relatively small so that the bearing friction and bearing wear are slight.

In the case of instruments having a plurality of disc-supporting shafts comprising a measurement cell, the shearing of the substances to be measured can take place in the intermediate spaces defined by the annular rings extending from the inner wall of the measurement housing into the measurement cell and, in addition, can take place in the spaces formed by the movable discs seated on different shafts. When using a plurality of shafts, a mixing of the substance to be measured and a rapid replacement of the liquid in the measurement gap, take place simultaneously during the measurement process. If longer shafts are used, it is possible to arrange the pairs of movable or measurement discs in such manner on the shaft within the measurement space that the shearing, and thus the viscosity determinations, can take place at different places in the measurement space. The measurement discs can also have roughened, rippled or undulated surfaces in order to prevent break-away or slippage effects which yield erroneous readings.

In accordance with one preferred embodiments of the invention wedge shaped or outwardly divergent slots are provided by means of conical shaped discs. By the conical development of the rotary discs, a uniform shear-gradient field is produced in the measurement gap which is the essential condition for measurement of viscosity under physically determinable conditions. The use of cones instead of discs also affords the other advantages described above, namely the production of large shearing surfaces with rotary bodies of small mass, as well as an easily obtainable rapid replacement of the measurement liquid in the measurement gap.

A plate-cone principle has previously been used for laboratory test equipment. In such devices, only one plate and one cone are used, the two being held at a given distance apart from each other. The resultant moment of rotation produced by shearing of the substance in the measurement gap formed by the cone and plate is measured. If the wedge gap angle is kept small, then the quotient of the speed of rotation divided by distance apart, known as the shear gradient, is constant at each point of the gap.

The viscosimeter formed in accordance with the present invention, however, is an immersion plate cone viscosimeter in which the cones are fastened at a distance from each other on a motor-driven shaft or are arranged in the inner wall of the measurement cell housing. Replacement of the substance to be measured in the measurement gap can readily be effected. The corresponding counterparts, i.e., discs, are either fastened to the inner wall of the inside of the measurement cell wall or fastened to the shaft. The cones and discs can also be fastened to two or more rotating shafts, in order to achieve a faster replacement of the substance being measured in the gap formed by the disc and the cone. In the case of the arrangement of the discs and cones on two shafts, one of the shafts can be movably mounted in order to achieve faster replacement of the liquid. If desired the displacement of the shaft can be effected automatically, as by a cam.

The invention will be explained further by the accompanying specification describing preferred embodiments thereof, having reference to the accompanying drawings, in which:

FIGURE 1 is a view in longitudinal section of a viscosimeter formed in accordance with the invention;

FIGURE 2 is a full face view of one measurement disc of the rotary body;

FIGURE 3 is a view in transverse section of another embodiment of the invention with three rotating bodies having parallel axes;

FIGURE 3A is a fragmentary view of one measurement disc taken on the line 3A—3A of FIGURE 3;

FIGURE 4 is a view in longitudinal section of the viscometer of FIGURE 3;

Figure 5:
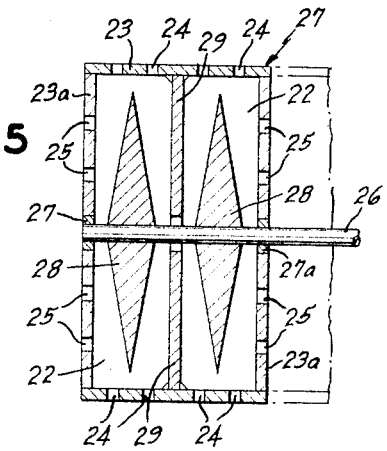
FIGURE 5 shows a measurement chamber formed in accordance with the invention in a central vertical section with annular discs rigidly installed in wedge shaped spaces between every two discs.

Referring to FIGURE 1 of the drawings, there is shown a viscometer 1 having a cylindrical housing 2, the surface of which is provided with a plurality of holes 3 and 4 and the left-hand end 5 of which is provided with a plurality of holes 6 through which pass the liquid to be measured. The housing is disposed within a liquid contained (shown in phantom lines) which can take the form of a vat or conduit. Affixed to the inner wall of the housing 2 and arranged at distances apart which can be adapted to the specific requirements, are a plurality of annular vanes 8, centrally apertured to receive a drive shaft 10. The drive shaft 10 carries a series of rotary members or measurement discs 11, keyed thereto, and extending radially into the spaces 9 between the annular vanes 8 to points proximate to the inner wall of the housing 2.

The shaft 10 has its journals 12 and 13 supported in the right-hand and left-hand ends, 5 and 14 respectively, of the housing. The shaft 10 can be driven by an electric motor 18, the drive shaft of which is connected to the shaft 10 by an interposed torque measuring unit 17 which can take the form of a coiled leaf spring connected at its center to the motor shaft and at its outer end to the shaft 10.

In the illustrated arrangement, the motor is disposed externally of the liquid container or vat and the coupling is effected through a pair of magnets 15 and 16. It will be understood that magnetic torque measuring units can also be used in which the slippage of the magnetic coupling varies with torque. In the illustrated arrangement the angular displacement between the spring 17 and the magnetic element 16 will represent viscosity, there being no intended angular displacement between the coupling elements 15 and 16.

The shaft 10 can also be driven directly by the torque measuring device 17 or by other suitable driving means and using other torque measuring devices such as those disclosed in the applicants' copending application Serial No. 237,489 filed November 14, 1962, entitled Viscosity Measuring Instrument, now Patent No. 3,229,506.

In the embodiments shown in FIGURES 3 and 4, there are provided instead of a single shaft 10, several shafts, for instance, three shafts 10a, 10b and 10c. This arrangement has the advantage that the effective shearing surfaces of the annular vanes or discs 11a, 11b and 11c keyed onto the shafts 10a, 10b and 10c are substantially increased.

As can be noted from the drawing, the vanes or discs 11a, 11b and 11c keyed onto the three shafts cooperate with the annular rings 8 provided on the inner wall of the housing 2 by interleaving therewith. If desired, the discs 11a, 11b and 11c can also be arranged to overlap each other towards the center of the housing. This embodiment has the advantage that during the measurement there is simultaneously obtained efficient mixing and rapid replacement of the substance in the measurement gap, while at the same time laminar flow is maintained. It will be understood that if several shafts with measuring discs are used, the annular rings fastened to the inner wall of the housing 2 can in certain cases be dispensed with. Also, it will be understood that the viscometer can be used without a specific housing, such as the housing 2, in which case the disc assembly can be immersed directly into the fluid to be measured. The discs 11a, 11b and 11c are illustrated as having undulated or roughened surfaces. Such surface increases friction and reduces slippage or break-away from the fluid under measurement.

The shafts 10a, 10b and 10c of the embodiment of FIGURE 4 are preferably driven from a common source (not shown) by suitable coupling devices. Torque measurement can be effected as in the embodiments of FIGURE 1, either externally or internally of the viscometer housing or of the fluid vat. It will be understood that electrical or mechanical pick-offs can be used in conjunction with the torque-measuring unit. The relative angular displacement between the shift of the motor 18 and the coupling member can be measured by a potentiometer and displayed on a voltmeter or it can be recorded by fixing the relative angular positions of the parts before the motor is stopped, so that a direct visual read-out can be made when the motor is stopped. If desired, a continuous output can be used to control apparatus for injecting materials such as solvents into the fluid being measured to maintain a desired viscosity.

In the embodiment shown in FIGURE 5, a housing 21, preferably of cylindrical shape, surrounds a measurement cell 22 and a shell 23, the ends 23a of which are provided with a plurality of boreholes 24 and 25 through which the replacement of the measurement liquid can be effected. In the center of the measurement cell 22, there is supported in bearings 27 and 27a, a shaft 26, driven by a motor (not shown). Rotating bodies or members 28, which serve as measurement discs, are keyed onto the shaft 26.

These rotary bodies, as can be seen in FIGURE 5, are developed as flat double cones, so that between them there are formed spaces in the shape of wedge gaps narrowing toward the shaft 26. The number of conical rotary bodies 28 can be varied to suit particular requirements.

Into the intermediate space or wedge gap between the adjacent pair of conical rotary bodies there extends an annular disc 29 fastened to the inner wall of the shell 23 of the measurement cell housing 21.

Figure 6:
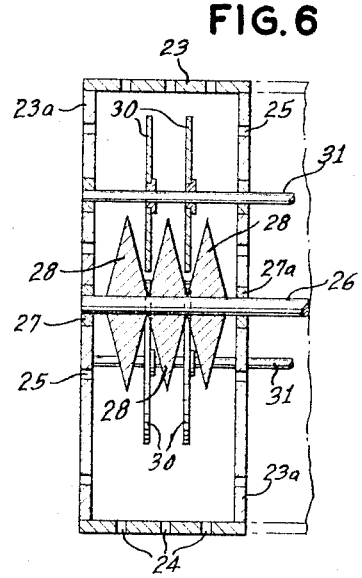
FIGURE 6 shows another embodiment of the invention with discs rotating on two parallel shafts.

In the embodiment shown in FIGURE 6, instead of the annular discs 29 rigidly installed in the measurement cell, there are keyed onto two shafts 31 arranged parallel to the main shaft 26, a number of discs 30 which extend into the spaces between the rotary bodies 28. The shafts 31 are preferably driven in the same direction, or if driven in opposite directions, are driven at different speeds in order to affect relative movement between the opposing surfaces.

Due to the fact that the auxiliary shafts 31 rotate in the same direction of rotation or in a direction of rotation opposite the direction of rotation of the main shaft 26, the frictional resistances for the substance being measured are increased to a greater or lesser extent so that in each case the conditions most favorable for the measurement of the substance to be measured can be produced.

Figure 7:
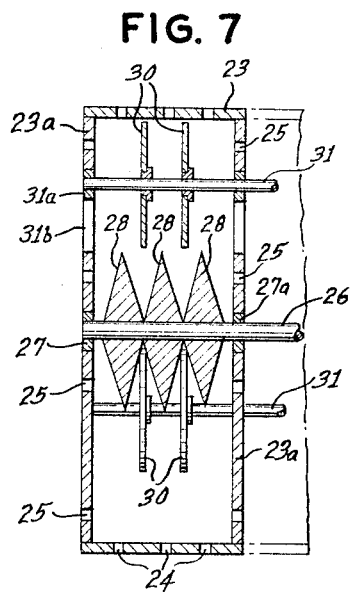
FIGURE 7 shows the subject matter of FIGURE 6 but with an auxiliary shaft which is displaceable parallel to the main shaft.

This objective is also achieved by the embodiment of the measurement device shown in FIGURE 7 in which the measurement discs 30 keyed onto one of the two auxiliary shafts 31 can be shifted laterally to a greater or lesser depth into the wedge gaps between the rotary bodies 28 on the main shaft 26. As best seen in the mounting of the uppermost shaft 31. The bearings 31a are mounted in slots 31b to provide the desired freedom of movement.

The invention is not limited to the embodiment described above and shown in the drawing, but rather various changes can be made without thereby going beyond the scope of the invention. Thus, for instance, it is possible to employ flat discs instead of the conical discs for the rotary members on the main shaft and to develop the discs 30 with surfaces which converge as they approach the center of the unit. These tapered members can be rigidly arranged on the inner wall of the measurement cell or seated on an auxiliary shaft 31.

Furthermore, the discs 28 on the main shaft as well as the stationary annular discs 29 or the discs 30 seated on the auxiliary shaft 31 can be developed as conical discs, thus achieving the same end result. If several auxiliary shafts 31 are provided with measurement discs, all of more of these shafts can be mounted for lateral adjusting movement. It will also be understood that if the reacting discs 30 are fastened on auxiliary shafts, as shown in FIGURES 6 and 7, it is not necessary to install the measuring device in a housing.

The invention should not, therefore, be regarded as limited except as defined by the following claims.

We claim:

1. Apparatus for measuring the viscosity of liquid and plastic materials, comprising a rotatable body adapted to be at least partially enveloped in the substance to be measured, a housing for said rotatable body, said rotatable body comprising a plurality of laterally spaced-apart, generally parallel, coaxially disposed members, a plurality of substantially parallel, laterally spaced-apart vanes carried by the housing and disposed, respectively, in the spaces between the members on the rotatable body, means to rotate said members on a common axis substantially normal to the planes of revolution of the surfaces of the members, means to measure the torque thereon, said vanes and members having opposing surfaces which upon relative rotation maintain substantially uniform spacing one from the other.

2. Apparatus as set forth in claim 1, said coaxially disposed members of the rotatable body comprising discs.

3. Apparatus according to claim 1, said rotatable body including a plurality of parallel shafts arranged generally about the circumference of a common circle, each having a plurality of generally parallel, laterally spaced apart members thereon, and means to rotate all of said shafts.

4. Apparatus according to claim 3, said laterally spaced-apart members on the shafts comprising discs interleaved to overlap in the space bounded by the shafts.

5. Apparatus according to claim 1, said housing being closed and having inlet opening and outlet openings through which the replacement of the material being measured takes place.

6. Apparatus according to claim 1, said coaxially disposed members and said vanes being formed with relatively inclined surfaces to define wedge-shaped gaps in which the width of the gap increases moving radially outwardly from the axis of rotation of the member, whereby the shearing of the substance to be measured takes place in a plurality of wedge-shaped gaps, whereby the maximum surface speed for the relatively moving members and vanes occurs in the widest portion of the wedge-shaped gaps.

7. Apparatus as set forth in claim 6 wherein rotary members defining the wedge-shaped gaps are conical and wherein the radial walls of each conical member converge uniformly with increasing radius.

8. Apparatus as set forth in claim 7, said housing surrounding said vanes, said vanes comprising annular shaped members carried by the inner wall of the housing and extending centrally into the wedge-shaped gaps defined by the rotary members.

9. Apparatus as set forth in claim 6 including one or more auxiliary shafts disposed parallel to the axis of rotation of the rotary members, and a plurality of members on said auxiliary shafts extending into the wedge-shaped spaces.

10. Apparatus as set forth in claim 9 including means to mount said auxiliary shafts for adjusting movement transversely with respect to their longitudinal axis.

11. Apparatus as set forth in claim 5 wherein said vanes carried by the inner wall of the housing each comprise walls which converge in the direction of the axis of rotation of rotatable members to define wedge-shaped gaps.

12. Apparatus as set forth in claim 9 wherein the members carried by said auxiliary shafts each includes walls which converge in the direction of axis of rotation of the rotary members.

References Cited by the Examiner
UNITED STATES PATENTS

| 2,267,317 | 12/1941 | Veenschoten | 73—59 |
| 2,305,531 | 12/1942 | Hurndall | 73—60 |
| 2,626,786 | 1/1953 | McGlothlin | 73—59 X |
| 2,828,621 | 4/1958 | Von Rosenberg | 73—59 |
| 2,904,401 | 9/1959 | Booth | 73—59 X |
| 3,008,326 | 11/1961 | Martin | 73—60 |
| 3,115,769 | 12/1963 | Bowen | 73—59 |
| 3,122,914 | 3/1964 | Stabe et al. | 73—59 |

DAVID SCHONBERG, *Primary Examiner.*